US010018166B2

United States Patent
Veit et al.

(10) Patent No.: US 10,018,166 B2
(45) Date of Patent: *Jul. 10, 2018

(54) FUEL FILTER OF AN INTERNAL COMBUSTION ENGINE AND FILTER ELEMENT OF A FUEL FILTER

(71) Applicant: MANN+HUMMEL GMBH, Ludwigsburg (DE)

(72) Inventors: Martin Veit, Gaertringen (DE); Martin Klein, Ludwigsburg (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 183 days.

This patent is subject to a terminal disclaimer.

(21) Appl. No.: 14/840,847

(22) Filed: Aug. 31, 2015

(65) Prior Publication Data

US 2016/0010605 A1  Jan. 14, 2016

Related U.S. Application Data

(63) Continuation of application No. 13/709,207, filed on Dec. 10, 2012, now Pat. No. 9,121,376.

(30) Foreign Application Priority Data

Dec. 9, 2011  (DE) .................. 10 2011 120 653

(51) Int. Cl.
| | |
|---|---|
| *F02M 37/22* | (2006.01) |
| *B01D 29/21* | (2006.01) |
| *B01D 29/58* | (2006.01) |
| *B01D 36/00* | (2006.01) |
| *B01D 29/11* | (2006.01) |
| *B01D 35/30* | (2006.01) |

(52) U.S. Cl.
CPC ........... *F02M 37/221* (2013.01); *B01D 29/11* (2013.01); *B01D 29/21* (2013.01); *B01D 29/58* (2013.01); *B01D 35/30* (2013.01); *B01D 36/003* (2013.01); *B01D 2201/291* (2013.01)

(58) Field of Classification Search
None
See application file for complete search history.

(56) References Cited

U.S. PATENT DOCUMENTS

| | | | |
|---|---|---|---|
| 2,864,505 A | 12/1958 | Kasten | |
| 3,187,895 A | 6/1965 | Pall et al. | |
| 4,372,847 A | 2/1983 | Lewis | |
| 4,477,345 A | 10/1984 | Szlaga, Jr. | |
| 2009/0250402 A1 | 10/2009 | Jiang et al. | |

FOREIGN PATENT DOCUMENTS

| | | |
|---|---|---|
| EP | 1256707 A2 | 11/2002 |
| WO | 2011107262 A1 | 9/2011 |

*Primary Examiner* — Benjamin M Kurtz
(74) *Attorney, Agent, or Firm* — James Hasselbeck

(57) ABSTRACT

A filter (10) with a filter element (36) are described. A housing (12) includes at least one fuel inlet, fuel outlet (18) and a water outlet (30) for water separated from the fuel. The filter element (36) within the housing separates the fuel inlet (26) from the fuel outlet (18). The filter element (36) includes a hollow body filter medium (38) flowed through radially. A water separation unit (56) with a hollow body hydrophobic fuel-permeable separating medium (66) separates water contained in the fuel and includes at least one support structure disposed in the flow path (78) in such a way that a precipitation gap (74) is realized between the filter medium (38) and the separating medium (66). The precipitation gap (74) is connected with the water outlet (30).

3 Claims, 3 Drawing Sheets

US 10,018,166 B2

FUEL FILTER OF AN INTERNAL COMBUSTION ENGINE AND FILTER ELEMENT OF A FUEL FILTER

CROSS REFERENCE TO RELATED APPLICATIONS

This application claims is a Continuation of U.S. patent application Ser. No. 13/709,207 filed Dec. 10, 2012 and claims the benefit of foreign application DE 10 2011 120 653.5 filed in Germany on Dec. 9, 2011 and which is hereby incorporated by reference in its entirety.

TECHNICAL FIELD

The invention relates to a fuel filter for fuel, in particular Diesel fuel, of an internal combustion engine in particular of a motor vehicle, with a housing which features at least one fuel inlet for fuel to be cleaned, at least one fuel outlet for cleaned fuel and at least one water outlet for water separated from the fuel, and in which a filter element is disposed that separates the fuel inlet tightly from the fuel outlet and that features a filter medium designed as hollow body that can be flowed through from the inside to the outside or from the outside to the inside for filtering the fuel.

The invention relates furthermore to a filter element of a fuel filter for fuel, in particular Diesel fuel, of an internal combustion engine in particular of a motor vehicle that can be disposed in a housing of the fuel filter in such a way that it separates a fuel inlet of the housing tightly from a fuel outlet and that features a filter medium designed as hollow body that can be flowed through from the inside to the outside or from the outside to the inside for filtering the fuel.

BACKGROUND OF THE INVENTION

A fuel filter is known from the US 2009/0250402 A1 with which particles and water can be removed from a fuel. The fuel filter features a housing in which a filter element is disposed. The housing has inlets for the fuel to be filtered and an outlet for the cleaned fuel. The filter element separates the inlets from the outlet. The filter element has a cylindrical outer filter media step and a cylindrical inner filter media step that is disposed in the outer filter media step with a radial distance. The outer filter media steps consist of a material that is suited to coalesce free water and emulsified water that is contained in the fuel. The inner filter media step consists of a water-separating medium that is suited to separate water from the fuel so that no water can flow downstream of the inner filter media step. In addition, the outer filter media step and the inner filter media step are suited to remove or to capture undesired particles from the fuel. The inner filter media step extends between a first lower end cap and an upper end plate. The first lower end cap comprises a pair of opposing flanges that extend from a basic section of the first lower end cap to the top. The outer filter media step extends between a second lower end cap and the upper end plate. The second lower end cap comprises also a pair of opposing flanges that extend from a basic section to the top. The outer filter media step has a longer vertical length than the inner filter media step. Due to the differences in length, a gap is realized between a lower end face of the inner filter media step and a lower front face of the outer filter media step. A radial gap is provided between the outer circumferential side of the inner filter media step and an inner circumferential side of the outer filter media step. The radial gap allows water that was coalesced in the outer filter media step to move downwards as soon as water drops have been formed by means of the outer filter media step and leave this filter media step. The axial overlap of the filter medium of the outer filter media step and the filter medium of the inner filter media step is restricted by the difference in length and the axial extension of the fluid-impermeable flanges of the two end caps. The flanges can influence the flow course of the fuel and/or the water in the radial gap and thus the properties of the fuel.

SUMMARY OF THE INVENTION

An object of the present invention is to realize a fuel filter and a filter element of a fuel filter of the above-mentioned type in which the separation of water contained in the fuel is further enhanced.

This object is solved according to the invention by the fact that a water separation unit with a hydrophobic fuel-permeable separating medium designed as hollow body for separating water contained in the fuel and at least with a support structure of the separating medium is disposed in the flow path of the fuel behind the filter medium, surrounding it or in the interior area defined by it, such that between the filter medium and the separating medium a precipitation gap is realized which is connected with the water outlet, and that the separating medium is disposed in a flow direction of the fuel through the separating medium at the level of and/or behind upstream sides of the at least one support structure of the separating medium.

According to the invention the filter element is of multi-level shape. The filter medium filters in particular particles which contaminate the fuel. In the flow path of the fuel behind the filter medium is disposed the separating medium for separating water contained in the fuel. The precipitation gap for separated water is realized between the filter medium and the separating medium. Because the separating medium is disposed at the level of and/or behind upstream sides of the at least one support structure of the separating medium, the precipitation gap is larger than for a filter element in the case of which the separating medium is disposed in flow direction before the upstream sides of the support structure of the separating medium. Water drops, which are contained in the fuel, can be retained at the separating medium and then discharged via the precipitation gap through the filter element. Due to the larger precipitation gap, the separated water drops can flow to the water collecting chamber nearly without encountering obstacles. Depending on the specific weight of the fuel, the precipitated water drops can either sink downward or rise upward.

Advantageously, the separating medium can have the shape of a sieve. A sieve-type, in particular woven separating medium has the advantage that the water drops are held by the sieve fibers and can, in particular, either drop downward or rise upward. A sieve-type separating medium retains the water optimally. The mesh sizes of a sieve-type fabric can be defined and predetermined easily. It can be designed to be optimally permeable for the fuel. A sieve-type structure can easily minimize the pressure loss at the separating medium. Advantageously, the separating medium can extend almost over the complete extension of the filter medium. Thus, the separating medium can nearly completely cover a clean side of the filter medium so that the precipitation gap can nearly extend over the whole clean side of the filter medium. In this way, a sufficiently large surface to be flowed through can be obtained at the filter medium and at the separating medium. Thus, water can be separated over the whole extension of the clean side of the filter medium. In this way, the water separation is enhanced. Furthermore, the flow velocity of the fuel is reduced which has also a positive effect on the water separation.

To stabilize the filter medium, it is preferably supported by means of at least one support structure of the filter medium at least on the side of the precipitation gap.

In the case of a particularly preferred embodiment of the invention, impermeable areas of the support structure of the filter medium and the support structure of the separating medium are at least partially arranged offset to one another for liquid fluid, preferably in such a way that the precipitation gap extends at least in axial direction continuously. Due to the offset arrangement of fluid-impermeable areas, in particular of ribs and/or end bodies, bottlenecks are avoided in the precipitation gap. The fluid-impermeable areas can be provided at the filter medium and/or the water separation unit. However, other components, in particular a support tube, a central tube or a coalescence element, can be provided, the fluid-impermeable areas of which can be offset to those of the filter medium and the water separation unit. Thus, the precipitation gap extends continuously, hence uniformly and consistently. In particular, it does not feature any bottlenecks. A uniform flow, in particular of the precipitated water, is realized in the precipitation gap. Turbulences are avoided. In this way, the water separation is further enhanced. The uniform flow velocity in the precipitation gap prevents water drops from being carried away by the fuel in flow direction behind the separating medium. If it is advantageously intended that the filter medium is flowed through from radially inside to outside, the separating medium is then disposed outside the filter medium and surrounds it. If it is alternatively intended that the filter medium is flowed through from radially outside to inside, the separating medium is then disposed in an interior area of the filter medium.

Advantageously, the water can in particular be collected in a water collecting chamber which is connected with the water outlet The main flow direction of the water before the separating medium is primarily predefined by the gravity. The main flow path of the water in the filter element is therefore preferably predefined in such a way that in mounted state of the filter element it progresses substantially in spatially vertical direction. The fuel filter according to the invention allows also to clean fuels, the specific weight of which is greater than that of water with the water drops rising spatially in analogy to the top. For this purpose, the filter element can be disposed in opposite direction, rotated by 180° around a horizontal axis. Accordingly, the fuel inlet, the fuel outlet and the water outlet can be disposed accordingly.

The separating medium can be disposed in flow direction of the fuel at the level of the support structure of the separating medium, in particular at the level of upstream sides of the impermeable areas of the at least one support structure of the separating medium. The separating medium can be disposed between the impermeable areas in such a way that it ends at the downstream side with the impermeable areas. In particular, the separating medium can be integrally molded as one piece to the impermeable areas of the support structure of the separating medium.

The separating medium can also extend in flow direction behind the upstream sides of the support structure of the separating medium, in particular behind upstream sides of the impermeable areas of the support structure of the separating medium, and at the same time between the impermeable areas.

Advantageously, the separating medium can be disposed on and/or behind downstream sides of the support structure of the separating medium, in particular on and/or behind downstream sides of the impermeable areas of the support structure of the separating medium. The advantage is that during the manufacture of a water separation unit that is flowed through from radially outside to inside the separating medium can be simply overmolded preferably with a synthetic material to realize the support structure of the separating medium.

In an advantageous embodiment, struts of a central tube of the filter medium and struts of a supporting cage of the water separation unit, that extend in the same direction, can be offset in relation to each other. Advantageously, in a coaxial filter element circumferential struts of the central tube and the supporting cage extending transversely in relation to the axis or in circumferential direction can be axially offset to each other. Accordingly, axial struts of the central tube and the supporting cage extending axially in relation to the axis can advantageously be offset to each other in circumferential direction. Struts extending diagonally in relation to an axis, too, can be offset accordingly to each other. In this way, an overlap of the struts of the central tube and the supporting cage, which can result in bottlenecks in the precipitation gap, can be avoided.

In another advantageous embodiment, a frontal end plate of the filter medium and a frontal end body of the water separation unit can be offset in axial direction to each other and define an annular outlet port of the precipitation gap. Due to the offset arrangement of the end plate and the end body, the cross-section of the outlet port that can be flowed through corresponds more or less to the flow cross-section of the precipitation gap for the precipitated water. As a result, the precipitated water can uniformly leave the precipitation gap. In this way, the efficiency of the separation is further enhanced. Normally, the flow cross-section of the precipitation gap for the precipitated water extends horizontally. The cross-section of the outlet port that can be flowed through extends diagonally in relation to it.

In another advantageous embodiment, at least one coalescence medium designed as hollow body for separating water contained in the fuel can be disposed between the filter medium and the separating medium on the side of the precipitation gap that faces the filter medium. At the at least one coalescence medium, even very small water droplets in the fuel can merge into larger water drops in flow direction after the filter medium. In this case, the fine water droplets can be retained and enlarged at the at least one coalescence medium until they can be carried away again by the fuel flow and discharged from the at least one coalescence medium. Advantageously, two or more coalescence media can be disposed one after the other in flow direction. In this case, the first coalescence medium in flow direction can be advantageously finer, in particular it can have a smaller pore size, than the subsequent coalescence medium (media). In this way, the water separation at the coalescence media can be further enhanced.

Furthermore, the filter medium, the separating medium and possibly the at least one coalescence medium can be advantageously disposed coaxially. A coaxial arrangement saves space. Furthermore, in a coaxial arrangement a flow course of the fuel from radially outside to inside or from radially inside to outside can be easily optimized. The base area of the filter medium, of the at least one coalescence medium and of the separating medium can be similar. However, the base areas can also be different. They can, in particular, be round, oval or angular.

Advantageously, the filter medium and/or the at least one coalescence medium can each be multilayer to enhance their effectiveness. Alternatively or additionally, the separating medium can be single-layer. This enables a compact construction. Single-layer media can be easily manufactured and assembled. Advantageously, the filter medium can be designed in such a way that it serves only as particle filter and that the water droplets do not merge there. Furthermore, the separating medium can advantageously only be designed to retain water drops and not to filter particles. Furthermore, the at least one coalescence medium can advantageously serve exclusively to coalesce the water drops. In this way, the filtration of the particles, the coalescence of the water droplets and the separation of the water droplets from the fuel can be realized separated from each other in different stages. Each stage can thus be optimized with respect to its corresponding function.

Advantageously, the filter element can be a round filter element. Round filter elements can save space during installation. With round filter elements, an optimal relation between filter/separating surface with respect to the mounting space can be realized.

Furthermore, the housing can advantageously be openable and the filter element can be disposed replaceably in the housing. In this way, the filter element can be easily removed from the housing for replacement or maintenance purposes.

Furthermore, the object is solved according to the invention by the filter element by the fact that a water separation unit with a hydrophobic, fuel-permeable separating medium designed as hollow body for separating water contained in the fuel and with at least one support structure of the separating medium is disposed in the flow path of the fuel behind the filter medium, surrounding it or in the interior area defined by it, in such a way that between the filter medium and the separating medium a precipitation gap is realized which is connected with the water outlet, and that the separating medium extends almost over the whole extension of the filter medium, and that the separating medium is disposed in a flow direction of the fuel through the separating medium at the level of and/or behind upstream sides of the at least one support structure of the separating medium. The advantages and features listed in conjunction with the fuel filter according to the invention are valid for the filter element according to the invention and its advantageous embodiments.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
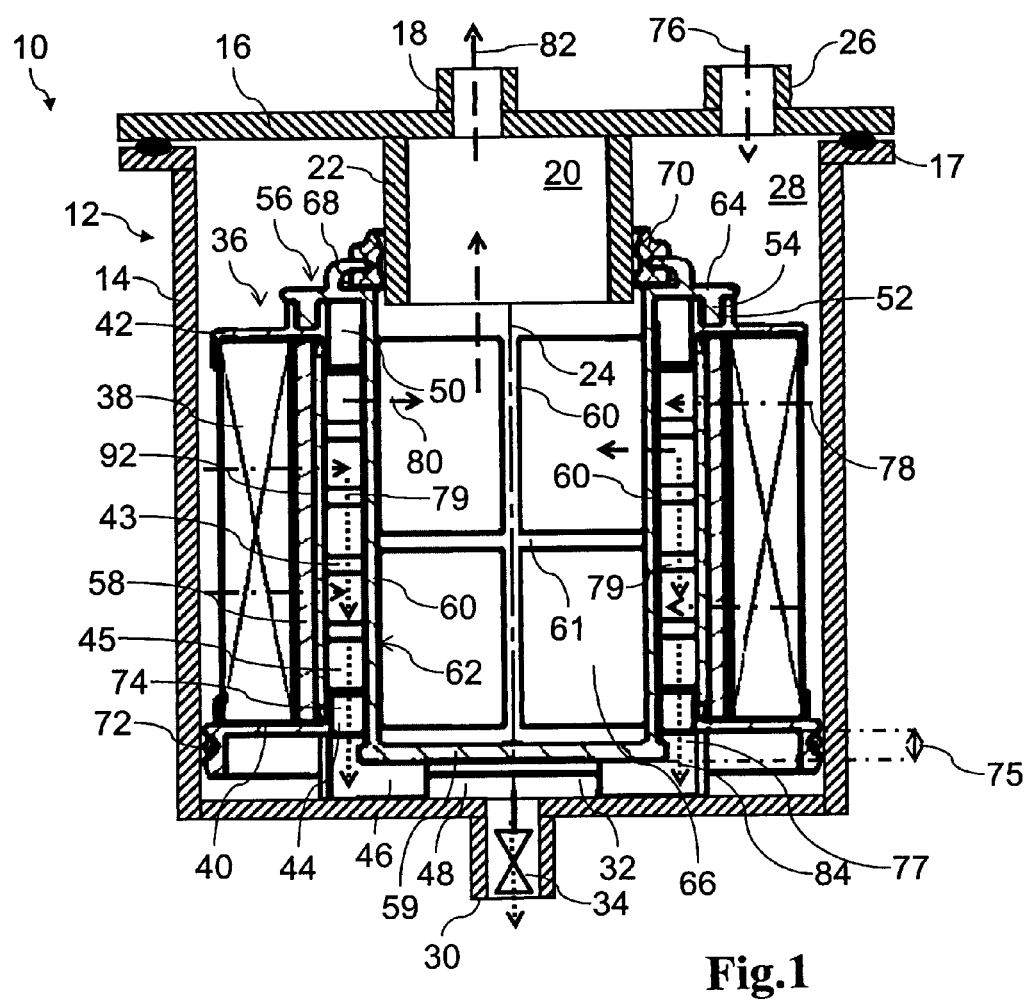
FIG. 1 schematically depicts a longitudinal section of a fuel filter with a replaceable three-stage filter element according to a first example of an embodiment in which a final end plate of a filter medium and an end plate of a water separation unit are offset to each other.

Identical components in the figure have the same reference numerals. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 shows in longitudinal section a fuel filter 10 of a fuel system of an internal combustion engine of a motor vehicle. The fuel filter 10 is designed to clean the fuel, for example Diesel fuel, used for operating the internal combustion engine. Furthermore, the fuel filter 10 is designed to separate water contained in the fuel.

The fuel filter 10 has a two-part housing 12 with a cup-shaped filter bowl 14 and a filter cover 16 that is detachably disposed on the filter bowl 14. An annular sealing 17 is disposed between the filter bowl 14 and the filter cover 16.

In the cover 16, an outlet port 18 for the cleaned fuel is disposed about centrally which is connected outside the housing 12 with a fuel discharge line not shown in FIG. 1. Inside the housing 12, the outlet port 18 is connected with a drain chamber 20 in an interior area of a connecting piece 22. The connecting piece 22 extends coaxially to a filter axis 24 on the side of the cover 16 that faces the inside of the housing 12 In the normal installation position and under normal operating conditions of the internal combustion engine, the filter axis 24 extends spatially vertical, as shown in FIG. 1. In the following, "axial", "radial", "coaxial", and "circumferential" relate to the filter axis 24, if not otherwise specified.

Radially outside the connecting piece 22, the cover 16 features an inlet port 26 for the fuel to be cleaned which is connected with an intake chamber 28 in the housing 12.

Outside the housing 12, the inlet port 26 is connected with a fuel supply line for the fuel, not shown in FIG. 1.

A water discharge nozzle 30 is disposed coaxially to the filter axis 24 in the bottom of the filter bowl 14. The water discharge nozzle 30 is connected with a water collecting chamber 32 underneath the housing 12. Outside the housing 12, the water discharge nozzle 30 is connected with a water discharge line not shown here via which water separated from the fuel can be discharged from the housing 12. A water drain valve 34 with a water-level sensor is disposed in the water discharge nozzle 30 The water drain valve 34 is closed in non-operating state so that no liquid can leave the water collecting chamber 32 through the water discharge nozzle 30 from the housing 12. When reaching a predefined maximum water level in the water collecting chamber 32, the water drain valve 34 opens automatically so that the separated water can be discharged via the water discharge nozzle 30.

A replaceable filter element 36 is disposed in the housing 12. The filter element 36 is designed as round filter element. The filter element 36 separates the inlet port 26 tightly from the outlet port 18. The filter element 36 comprises a star-shaped folded filter medium 38 that allows to filter particularly particles from the fuel to be cleaned. On the whole, the filter medium 38 has the shape of a coaxial circular cylinder jacket. On a lower front face facing the bottom of the filter bowl 14, the filter medium 38 is tightly connected with a fluid-impermeable final end plate 40. On its opposite upper front face facing the cover 16, the filter medium 38 is tightly connected with a connection end plate 42. Between the connection end plate 42 and the final end plate 40 extends coaxially in an interior area 45 of the filter medium 38 a skeletal central tube 43 featuring fluid passages which connects both end plates 40 and 42 with each other in a stable manner.

The final end plate 40 features a coaxial opening 44. The opening 44 is surrounded by the central tube 43. The opening 44 connects the interior area 45 with the water collecting chamber 32. On the exterior side facing the bottom of the filter bowl 14, the final end plate 40 has four supporting ribs 46 which extend in a uniformly distributed manner along an imaginary coaxial circular cylinder jacket. The imaginary circular cylinder jacket surrounds the opening 44 and the water discharge nozzle 30. The filter element 36 is supported by means of the supporting ribs 46 against the bottom of the filter bowl 14. Between the supporting ribs 46 are connecting orifices 48 via which the water in the water collecting chamber 32 can spread also radially outside the supporting ribs 46.

The connection end plate 42 features a coaxial opening 50. The opening 50 is surrounded by two coaxial protrusions which extend on the exterior side of the connection end plate 42 in axial direction. Both protrusions define a receiving groove 52 for a ring-type insertion rib 54 of a water separation unit 56 of the filter element 36.

Between the radially inner circumferential side of the filter medium 38 and the central tube 43 is a first coaxial coalescence medium 58. Radially inside the coalescence medium 58 joins a second coaxial coalescence medium 92. The coalescence media 58 and 92 are each single-layer non-woven fabrics. The first coalescence medium 58 is finer than the second coalescence medium 92, it has, for example, a smaller mesh size. The coalescence media 58 and 92 are circumferentially closed and extend between the connection end plate 42 and the final end plate 40. The coalescence media 58 and 92 are designed to bring together even the smallest water droplets contained in the fuel to form larger water drops.

The water separation unit 56 has a support structure of the separating medium in the shape of a supporting cage 62 with a connection section 64, which features also the insertion rib 54, and a separating medium 66.

The connection section 64 is about disk-shaped with a coaxial opening into which projects the connecting piece 22 of the cover 16. On its exterior side facing the cover 16, the connection section 64 has a coaxial connecting branch 68. The connecting branch 68 is bent radially inside by 90 degrees on its free front face. A profile ring seal 70 is placed on the radially inner edge of the connecting branch 68. The connecting piece 22 is inserted into the connecting branch 68 in such a way that the connection with the profile ring seal 70 is sealed.

The water separation unit 56 is inserted axially through the opening 50 of the connection end plate 42, preceded by the separating medium 66. The supporting cage 62 and the separating medium 66 are located in the interior area defined by the coalescence media 58 and 92, and therefore also in the interior area 45 of the filter medium 38.

The separating medium 66 consists of a hydrophobic sieve cloth. It has the shape of a pipe that is coaxial in relation to the filter axis 24. It extends from the axial height of the connection end plate 42 up to the axial height of the final end plate 40. The separating medium 66 is closed circumferentially. The axial extension of the separating medium 66 corresponds at least approximately to the axial expansion of the filter medium 38 and the coalescence media 58 and 92.

The peripheral wall of the supporting cage 62 has a grid-like shape. On its front face assigned to the connecting piece 22, the supporting cage 62 is open. The lower front face of the supporting cage 62 facing the water collecting chamber 32 is closed by means of an end plate 59. The end plate 59 is connected with the connection section 64 via axial struts 60 uniformly arranged in circumferential direction. In axial direction, nearly in the center between the end plate 59 and the connection section 64, is disposed a coaxial supporting ring 61 in relation to the filter axis 24 which connects the axial struts 60 with each other. The end plate 59, the axial struts 60, and the supporting ring 61 are fluid-impermeable. The separating medium 66 finishes with the axial outer sides of the axial struts 60, the supporting ring 61, and the end plate 59. Preferably, the separating medium 66 is located in a flow direction 80 of the fuel through the separating medium 66 at the level of the radially outer, which means upstream sides of the axial struts 60 and the supporting ring 61. However, the separating medium 66 can also be placed in flow direction 80 behind the radially outer sides of the axial struts 60 and the supporting ring 61. The supporting cage 62 can be integrally molded to the separating medium 66 or the other way round. The supporting cage 62 and the separating medium 66 can also be connected with each other as separate parts. The separating medium 66 and the supporting cage 62 can also be integrally formed with the same material, for example synthetic material, for example in an injection molding process.

A precipitation gap 74 is located in the interior area 45 between the separating medium 66 and the coalescence media 58 and 92. The precipitation gap 74 has the shape of an annular space. The precipitation gap 74 is defined radially outside by the coalescence media 58 and 92 and the central tube 43, and radially inside by the separating medium 66.

The supporting cage 62 protrudes the frontal outer face of the final end plate 40 of the filter element 36 in axial direction by one offset 75. An annular outlet port 77 which connects the precipitation gap 74 with the water collecting chamber 32 is realized between the end plate 59 of the supporting cage 62 and the final end plate 40. The offset arrangement of the final end plate 40 and the end plate 59 makes it possible that the flow cross-section of the precipitation gap 74 merges continuously without bottleneck into the outlet port 77. The radial extension of the precipitation gap 74, seen in axial direction, extends continuously. The flow cross-section of the precipitation gap 74 for the precipitated water extends horizontally in relation to the filter axis 24. The cross-section of the outlet port 77 that can be flowed through extends diagonally in relation to the filter axis 24.

The supporting ring 61 of the supporting cage 62 is offset in axial direction to the fluid-impermeable peripheral rings 79 of the central tube 43. The axial struts 60 of the supporting cage 62 are offset circumferentially in relation to fluid-impermeable axial struts of the central tube 43, which are hidden in FIG. 1 by the water separation unit 56. Thus, bottlenecks are also avoided in the precipitation gap 74.

At the radially outer circumferential side of the final end plate 40, an annular sealing 72 is furthermore disposed which is supported radially outside against the radially inner circumferential side of the filter bowl 14. The annular sealing 72 seals the intake chamber 28 against the water collecting chamber 32.

When the fuel filter 10 is operating, fuel to be cleaned is supplied from the fuel supply line through the inlet port 26 to the intake chamber 28 which is illustrated by an arrow 76

The fuel flows through the filter medium 38 from its raw side, which is illustrated by arrows 78, radially outside to its clean side radially inside. In doing so, particles are removed from the fuel. The filter medium 38 is the first stage of the complete three-stage fuel filter 10 for cleaning/separating water.

On the clean side, the fuel, cleaned from particles, flows through the coalescence media 58 and 92 from radially outside to inside. In doing so, very small water droplets contained in the fuel are caught at the coalescence media 58 and 92 and merge to form larger water drops. The coalescence media 58 and 92 form a second stage for the cleaning/water separation.

The fuel and the large water drops flow through the openings of the central tube 43 and reach the precipitation gap 74.

The fuel flows through the separating medium 66, which forms the third stage for the cleaning/water separation, from radially outside to inside which is illustrated by arrows 80, and rises upwards into the drain chamber 20. The cleaned fuel from which water is removed leaves the drain chamber 20 via the outlet port 18, illustrated by arrows 82, and reaches the fuel discharge line.

The separating medium 66 retains the large water drops. Due to their higher specific weight compared with the fuel, the water drops sink down in the precipitation gap 74, illustrated by arrows 84, through the outlet port 77 into the water collecting chamber 32. The offset arrangement of the peripheral rings 79 and the supporting ring 61 as well as the final end plate 40 and the end plate 59 has a positive effect on the flow course in the precipitation gap 74 of the fuel as well as of the downward sinking water drops.

As soon as the water-level sensor of the water drain valve 34 detects that the predefined maximum water level has been reached, the water drain valve 34 opens automatically. The water leaves the water collecting chamber 32 through the water discharge nozzle 30 and reaches the water drain line.

For maintenance purposes, for example for replacement or cleaning of the filter element 36, the cover 16 is removed from the filter bowl 14 in axial direction. The filter element 36 is then pulled out of the filter bowl 14 in axial direction.

To install the filter element 36, it is inserted in axial direction into the filter bowl 14, preceded by the final end plate 40. Subsequently, the cover 16 is placed in axial direction onto the open side of the filter bowl 14 preceded by the connecting piece 22 so that the connecting piece 22 protrudes tightly into the profile ring seal 70.

Figure 2:
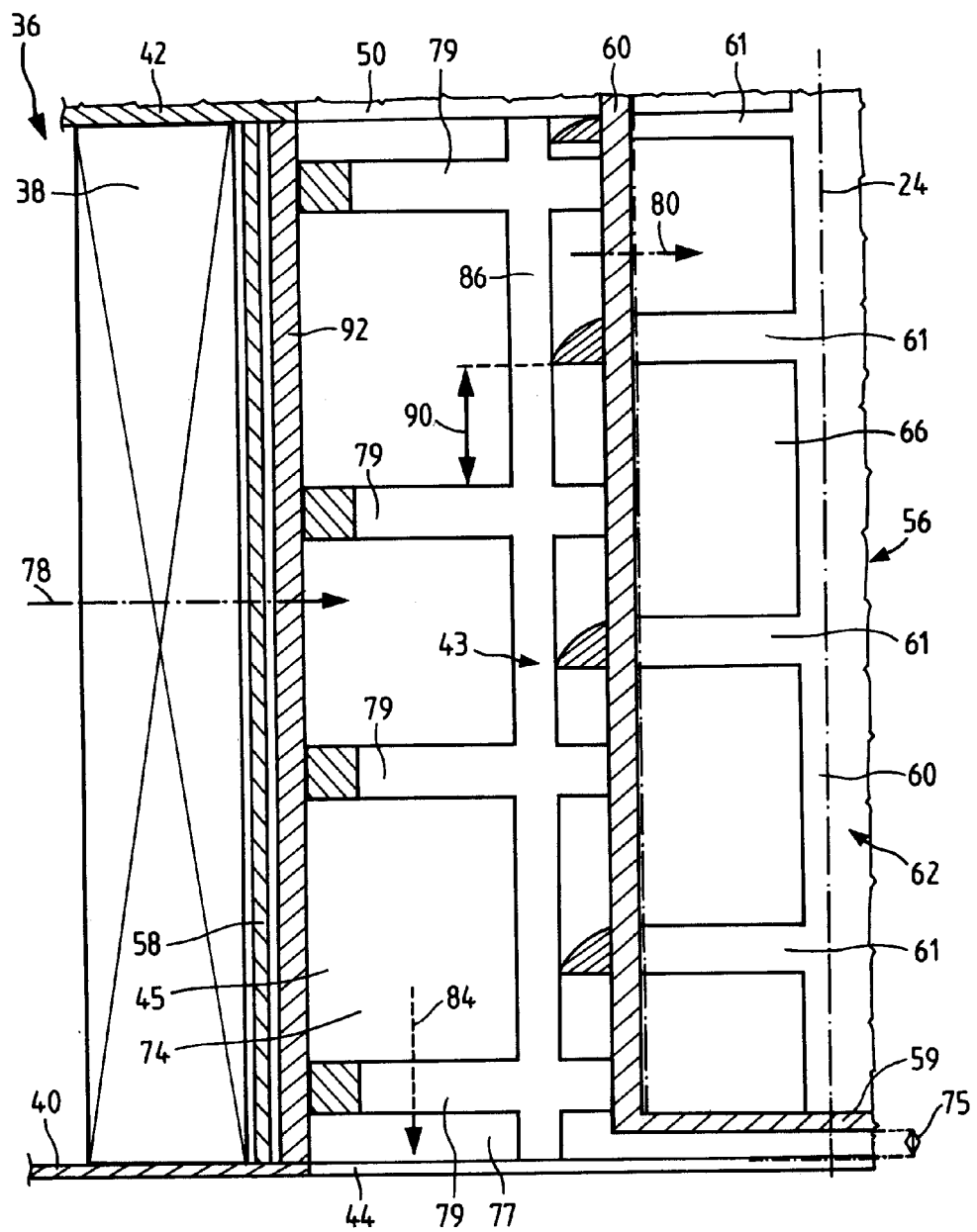
FIG. 2 schematically depicts a longitudinal section of a replaceable three-stage filter element according to a second embodiment which is similar to the filter element of FIG. 1.
Figure 3:
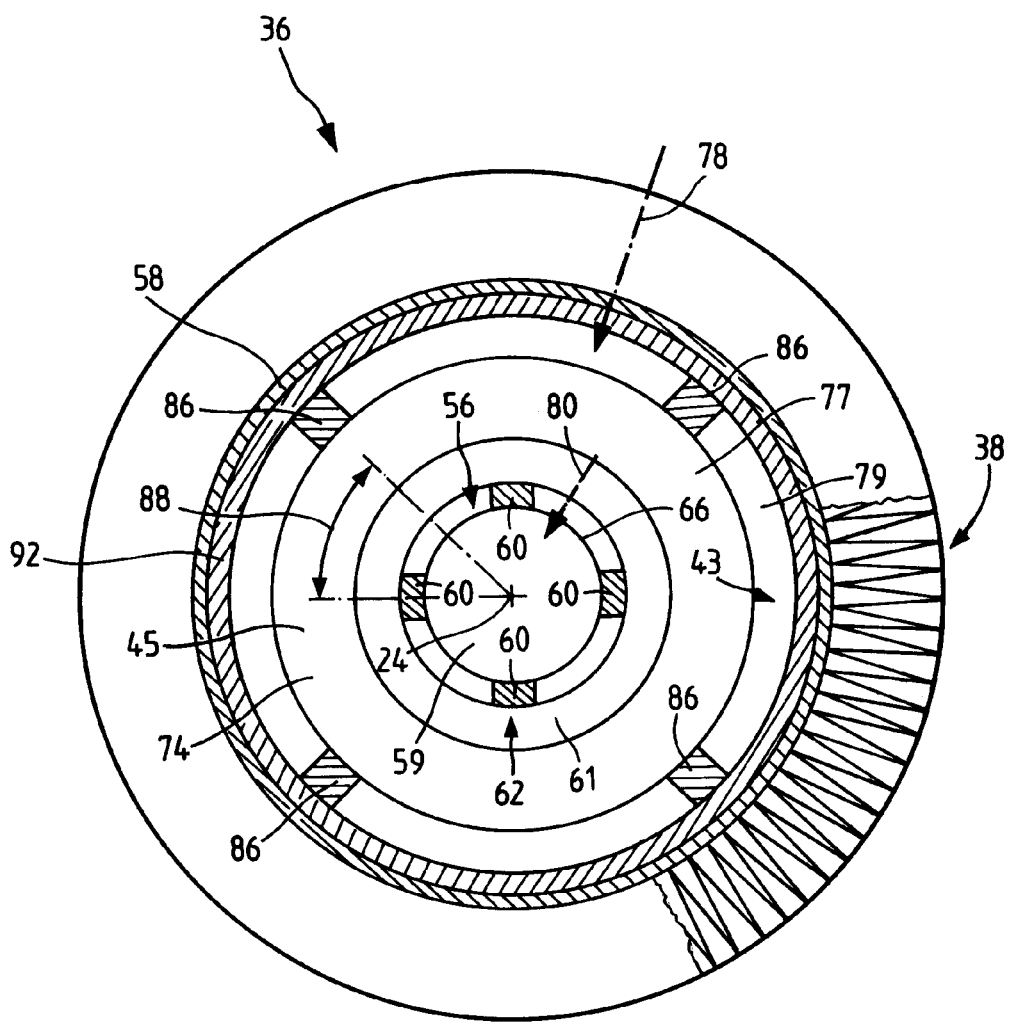
FIG. 3 is a cross-section of the filter element of FIG. 2.

A second example of an embodiment of a filter element 36 is shown in the FIGS. 2 and 3. Those elements that are similar to those in the first example of an embodiment in FIG. 1 have the same reference numerals. The second example of an embodiment differs from the first example of an embodiment in that the supporting cage 62 of the water separation unit 56 features a plurality of supporting rings 61. In analogy to the first example of an embodiment, the supporting rings 61 are offset in relation to the peripheral rings 79 of the central tube 43 in axial direction by one axial offset 90. In this way, bottlenecks are avoided in the precipitation gap 74.

The supporting rings 61 surround the axial struts 60 radially outside. The supporting rings 61 and the axial struts 60 are connected with each other as one piece. The separating medium 66 is disposed radially inside on the axial struts 60. It is, therefore, placed in flow direction 80 of the fuel through the separating medium 66 behind the upstream, radially inner and therefore also radially outer sides of the supporting rings 61 and the axial struts 60. To manufacture the water separation unit 56, the separating medium 66 can be overmolded radially outside with synthetic material to realize the supporting cage 62. The separating medium 66 can be placed alternatively also in flow direction 80 at the level of the radially outer sides of the axial struts 60 and the supporting rings 61.

The axial struts 86 of the central tube 43 and the axial struts 60 of the supporting cage 62 are offset circumferentially by one offset 88 in analogy to the first example of an embodiment. Thus, bottlenecks are avoided in the precipitation gap 74.

Furthermore, the supporting rings 61 feature inclined, in particular rounded upper sides, as a result of which the water drops which are retained by the separating medium 66, can flow downwards particularly well.

In the above described examples of an embodiment of a fuel filter 10 and a filter element 36, the following modifications are among others possible:

The invention is not limited to a fuel filter 10 of an internal combustion engine of a motor vehicle. Rather, it can also be used with different internal combustion engines, for example with industrial engines.

Instead of using Diesel fuel, the fuel filter 10 can also be used for cleaning/maintenance purposes of another liquid fuel. If a fuel is used with a specific weight which is bigger than that of water, the water drops rise in analogy. In this case, the filter element 36 can be disposed in opposite direction. By the same token, the fuel inlet, the fuel outlet and the water outlet can be disposed accordingly in an appropriate manner.

Instead of being star-shaped folded, the filter medium 36 can also be realized as different hollow body, for example also unfolded.

Instead of being made of a single-layer non-woven fabric, the coalescence media 58 and 92 can also consist of a different, even multi-layer coalescence material suited for the coalescence of water drops. It is also possible to provide more or less than two coalescence media one after the other which can be flowed through.

Instead of the supporting cage 62 protruding the frontal outer face of the final end plate 40 of the filter element 36 in axial direction, the final end plate 40 can also protrude the supporting cage 62 by one offset which allows a continuous transition from the precipitation gap 74 to the outlet port 77.

Several supporting rings 61 which are offset in relation to any different fluid-impermeable areas of the filter medium 38, the coalescence media 58 and 92 and/or the central tube 43 can also be provided in the supporting cage 62. It is also possible to use a supporting cage without supporting ring. The separating medium can also be integrated in the supporting cages. The separating medium can, for example, be integrally formed with the supporting cage.

In addition, the axial struts 60 can also be offset in relation to corresponding fluid-impermeable axial struts of the central tube 43 in circumferential direction.

Instead of being realized as hollow cylinder, the filter medium 38, the coalescence media 58 and 92 and/or the separating medium 66 can also be realized in a different design, for example as hollow cone. Instead of being realized with round base areas, they can also be realized with different base areas, for example in an oval or angular design.

The annular sealing 72 is also not needed. Preferably, the final end plate 40 can tightly abut on the radially inner circumferential side of the filter bowl 14.

Instead of being disposed in the interior area 45 of the filter medium 38, the separating medium 66 can also be disposed radially outside, surrounding the filter medium 38 and the coalescence media 58 and 92. In this case, the fuel to be cleaned can flow through the filter medium 38 from radially inside to outside. In this case, the coalescence media 58 and 92 can also be located preferably radially outside and surround the filter medium 38.

Instead of being supplied from above, the fuel to be cleaned can also be supplied from below to the raw side of the filter medium 38. Instead of being disposed centrally, the water discharge nozzle 30 can also be disposed eccentrically in the bottom of the filter bowl 14.

Instead of a replaceable filter element 36, a firmly and permanently mounted filter element can also be provided in the housing 12.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A fuel filter element which can be disposed within a housing of the fuel filter in such a way that it separates a fuel inlet of the housing tightly from a fuel outlet, the filter element comprising:
a filter medium arranged as hollow body which is flowed through from the inside to the outside or from the outside to the inside for filtering the fuel;
a water separation unit including
a support cage including:
a plurality of axial struts impermeable for fluid flow and having a radially inner surface and a radially outer surface;
a hydrophobic, fuel-permeable separating medium arranged as hollow body separating water contained in the fuel, the separating medium arranged on the plurality of axial struts;
a frontal end plate having a central opening extending therethrough;
a central tube arranged on an interior side of the frontal end plate positioned radially outwardly of and circumferentially surrounding the central opening;
a first coalescence medium supported on the central tube and arranged between the filter medium and the central tube, wherein the filter medium and first coalescence medium circumferentially surround the central tube;
wherein an axially extending precipitation gap is provided in radial spacing between the central tube and the support cage, the precipitation gap connected with the water outlet;
wherein the central tube has a grid structure having a plurality of fluid impermeable axially extending struts, wherein the plurality of axially extending struts of the central tube are angularly offset radially across the precipitation gap from the plurality of axial struts of the support cage.

2. The fuel filter element according to claim 1, further comprising
a second coalescence medium arranged radially between the first coalescence medium and the central tube;
wherein the first coalescence medium has a finer mesh size than the second coalescence medium.

3. The fuel filter element according to claim 1, further comprising
a connection end plate secured to an opposite axial end of the filter medium relative to the frontal end plate;
wherein the support cage and central tube are secured to the connection end plate such that the filter element with the filter medium, the first and second coalescence medium form a one piece component, exchangeable as a unit from the housing.

* * * * *